US012560731B2

(12) United States Patent
Valero et al.

(10) Patent No.: US 12,560,731 B2
(45) Date of Patent: Feb. 24, 2026

(54) WORK FLOW BASED ACOUSTIC PROCESSING SYSTEM AND METHOD

(71) Applicant: Schlumberger Technology Corporation, Sugar Land, TX (US)

(72) Inventors: Henri-Pierre Valero, Paris (FR); Takeshi Endo, Houston, TX (US); Hrvoje Markovic, Houston, TX (US); Yoshisuke Fukagawa, Sagamihara (JP); Yuta Okabe, Sagamihara (JP); Shinichi Sunaga, Tokyo (JP); Mitsuko Kitazawa, Sagamihara (JP); Ryoko Hayashi, Tokyo (JP); Ivayla Gueorguieva, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 320 days.

(21) Appl. No.: 18/296,494

(22) Filed: Apr. 6, 2023

(65) Prior Publication Data

US 2023/0296799 A1 Sep. 21, 2023

Related U.S. Application Data

(62) Division of application No. 15/759,536, filed as application No. PCT/IB2016/001353 on Sep. 23, 2016, now Pat. No. 11,644,588.

(Continued)

(51) Int. Cl.
G01V 1/36 (2006.01)
G01V 1/28 (2006.01)

(Continued)

(52) U.S. Cl.
CPC .............. *G01V 1/282* (2013.01); *G01V 1/303* (2013.01); *G01V 1/34* (2013.01); *G01V 1/46* (2013.01);

(Continued)

(58) Field of Classification Search
CPC .......... G01V 1/282; G01V 1/303; G01V 1/34; G01V 1/50; G01V 1/284; G01V 2210/41;

(Continued)

(56) References Cited

U.S. PATENT DOCUMENTS 6,654,688 B1 11/2003 Brie
8,103,493 B2 1/2012 Sagert (Continued)

OTHER PUBLICATIONS

International Search Report and Written Opinion issued in the related PCT application PCT/IB2016/001353, dated Jan. 11, 2017 (14 pages).

(Continued)

*Primary Examiner* — Krystine E Breier
(74) *Attorney, Agent, or Firm* — Kyle R. Miiller

(57) ABSTRACT

A method, article and system are provided for processing and interpreting acoustic data. The method and system includes providing a number of acoustic processing elements, each element being associated with an acoustic mode of a number of acoustic modes of a sonic measurement tool adapted to acquire data representing acoustic measurements in a borehole. In addition the method and system includes providing a user interface to organize a processing chain of the number of acoustic processing elements such that the acoustic processing elements process the acquired data according to a predefined workflow.

20 Claims, 10 Drawing Sheets

Related U.S. Application Data

(60) Provisional application No. 62/233,439, filed on Sep. 27, 2015.

(51) Int. Cl.

| | | |
|---|---|---|
| *G01V 1/30* | (2006.01) | |
| *G01V 1/34* | (2006.01) | |
| *G01V 1/46* | (2006.01) | |
| *G01V 1/50* | (2006.01) | |

(52) U.S. Cl.
  CPC ............... *G01V 1/50* (2013.01); *G01V 1/284* (2013.01); *G01V 2210/41* (2013.01); *G01V 2210/614* (2013.01); *G01V 2210/6222* (2013.01); *G01V 2210/74* (2013.01)

(58) Field of Classification Search
  CPC ..... G01V 2210/614; G01V 2210/6222; G01V 2210/74
  See application file for complete search history.

(56) References Cited

U.S. PATENT DOCUMENTS

| | | | |
|---|---|---|---|
| 8,730,763 | B2 | 5/2014 | Johnson |
| 8,902,702 | B2 | 12/2014 | Hirabayashi |
| 9,529,105 | B2 | 12/2016 | Collins |
| 9,864,098 | B2 | 1/2018 | Sequeira, Jr. |
| 10,712,466 | B2 | 7/2020 | Chen |
| 2006/0120217 | A1 | 6/2006 | Wu |
| 2011/0096627 | A1 | 4/2011 | Hill |
| 2012/0078600 | A1* | 3/2012 | Horne ..................... G01V 1/42 703/10 |
| 2012/0287754 | A1* | 11/2012 | Johnson ................... G01V 1/50 367/31 |
| 2014/0129479 | A1 | 5/2014 | Warner |
| 2014/0200816 | A1 | 7/2014 | Peng et al. |
| 2014/0209317 | A1 | 7/2014 | Dirksen |
| 2015/0049585 | A1* | 2/2015 | Collins ................... G01V 1/50 367/35 |
| 2018/0031722 | A1* | 2/2018 | Shu .......................... G01V 1/34 |
| 2018/0094514 | A1 | 4/2018 | Leem |
| 2019/0154856 | A1 | 5/2019 | Valero |

OTHER PUBLICATIONS

International Preliminary Report on Patentability issued in the related PCT application PCT/IB2016/001353, dated Apr. 5, 2018 (11 pages).

\* cited by examiner

200

E — 201

UMS — 204

R
C
V
R — 206

LMS — 208

I
S
O
L — 216

XDS — 218

YDS — 220

QS — 222

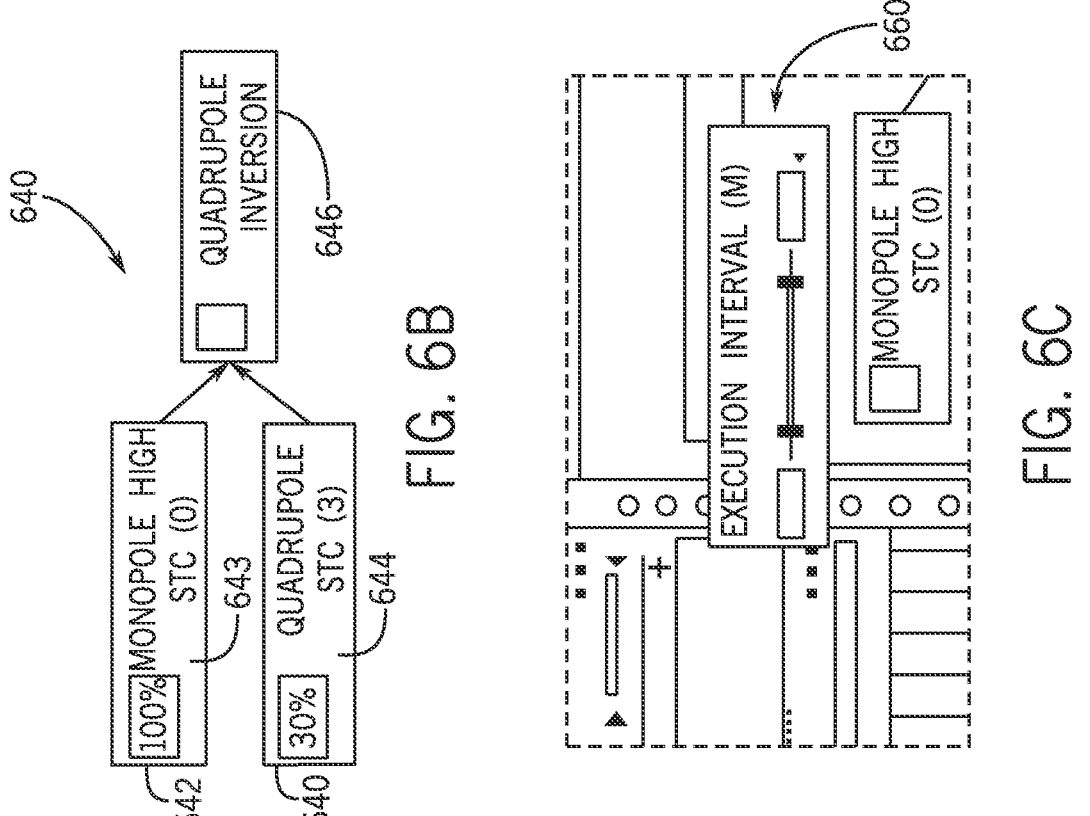
FIG. 6B
FIG. 6C
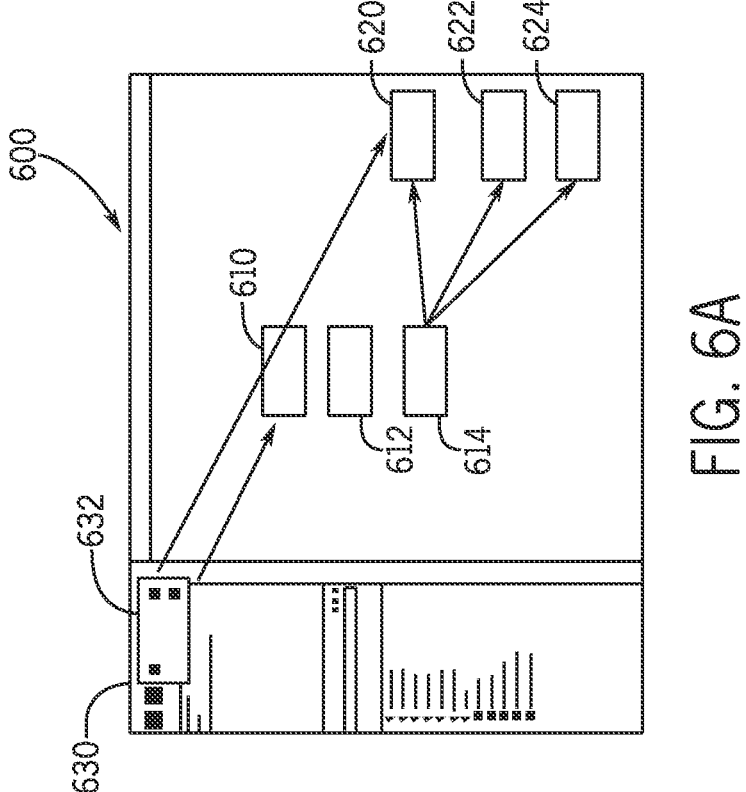
FIG. 6A

WORK FLOW BASED ACOUSTIC PROCESSING SYSTEM AND METHOD

RELATED APPLICATIONS

This application is a Divisional of U.S. patent application Ser. No. 15/759,536, filed Mar. 13, 2018, which is a National Stage Entry of PCT/IB2016/001353, filed Sep. 23, 2016, which claims the benefit pursuant to 35 U.S.C. § 119(e) to U.S. Provisional Patent Application Ser. No. 62/233,439 entitled, "WORKFLOW BASED ACOUSTIC PROCESSING SYSTEM AND METHOD," which was filed on Sep. 27, 2015, to Henri-Pierre VALERO, et. al., and is hereby incorporated by reference in its entirety.

BACKGROUND

Hydrocarbon fluids, such as oil and natural gas, are obtained from a subterranean geologic formation, referred to as a reservoir, by drilling a well that penetrates the hydro-carbon-bearing formation. During drilling and at other stages of exploration through production, various downhole tools may be used to acquire data for purpose of evaluating, analyzing, and monitoring the well bore and the surrounding geological strata. In some cases, the acquired data includes acoustic data (sonic or seismic), i.e., data acquired by sensors, or receivers, in response to acoustic energy inter-acting with the wellbore and the surrounding geological strata. The acquired data may be processed and interpreted for purposes of deriving information regarding the hydro-carbon-bearing formation, the well and other aspects per-taining to subterranean exploration.

Acoustic measurements have a wide range of applications covering various different domains (e.g., petro-physics, geo-physics, geo-mechanics, and rock physics), accordingly, acoustic processing output is beneficial for enabling various downstream workflows. For example, U.S. Pat. No. 6,654, 688, entitled, "PROCESSING SONIC WAVEFORM MEA-SUREMENTS," proposed an integrated acoustic processing methodology with advanced slowness processing algorithm. The processing methodology has been continuously evolv-ing due to new measurements and algorithms becoming available. However, managing and manipulating the acous-tic processing output to readily facilitate downstream work-flows is a general area that often is left behind with regards to development.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In accordance with one embodiment, a method is pro-vided including providing a plurality of acoustic processing elements, each element being associated with an acoustic mode of a plurality of acoustic modes of a sonic measure-ment tool adapted to acquire data representing acoustic measurements in a borehole. In addition the method includes providing a user interface to organize a processing chain of the plurality of acoustic processing elements such that the acoustic processing elements process the acquired data according to a predefined workflow.

In accordance with another embodiment, an article is provided comprising a non-transitory computer readable storage medium to store instructions that when executed by a computer cause the computer to provide at least one slowness estimate for a formation based at least in part on data representing acoustic waveforms measured downhole in a well using an acoustic measurement tool. In addition, the instructions cause the computer to perform forward modeling based at least in part on an acoustic model of the formation to generate modeled acoustic waveforms. Still further, the instructions cause the computer to execute providing at least one slowness estimate based at least in part on the modeled waveforms.

In accordance with still another embodiment, a system is provided comprising a processor-based integrated slowness determination engine comprising a plurality of acoustic processing elements, each element being associated with an acoustic mode of a plurality of acoustic modes of a sonic measurement tool adapted to acquire data representing acoustic measurements in a borehole. In addition, the system includes a graphical user interface to allow a user to organize a processing chain of the plurality of acoustic processing elements.

Other or alternative features will become apparent from the following description, from the drawings, and from the claims.

BRIEF DESCRIPTION OF THE DRAWINGS

Certain embodiments will hereafter be described with reference to the accompanying drawings, wherein like ref-erence numerals denote like elements. It should be under-stood, however, that the accompanying drawings illustrate only the various implementations described herein and are not meant to limit the scope of various technologies described herein. The drawings are as follows:

FIG. 6A illustrates use of the GUI to define parallel execution of workflows according to an example implemen-tation;

FIG. 6B is an illustration of the use of the GUI to define interactive execution according to an example implementa-tion;

FIG. 6C is an illustration of the use of the GUI to define an interval of the well being processed according to an example implementation.

DETAILED DESCRIPTION

Figure 1:
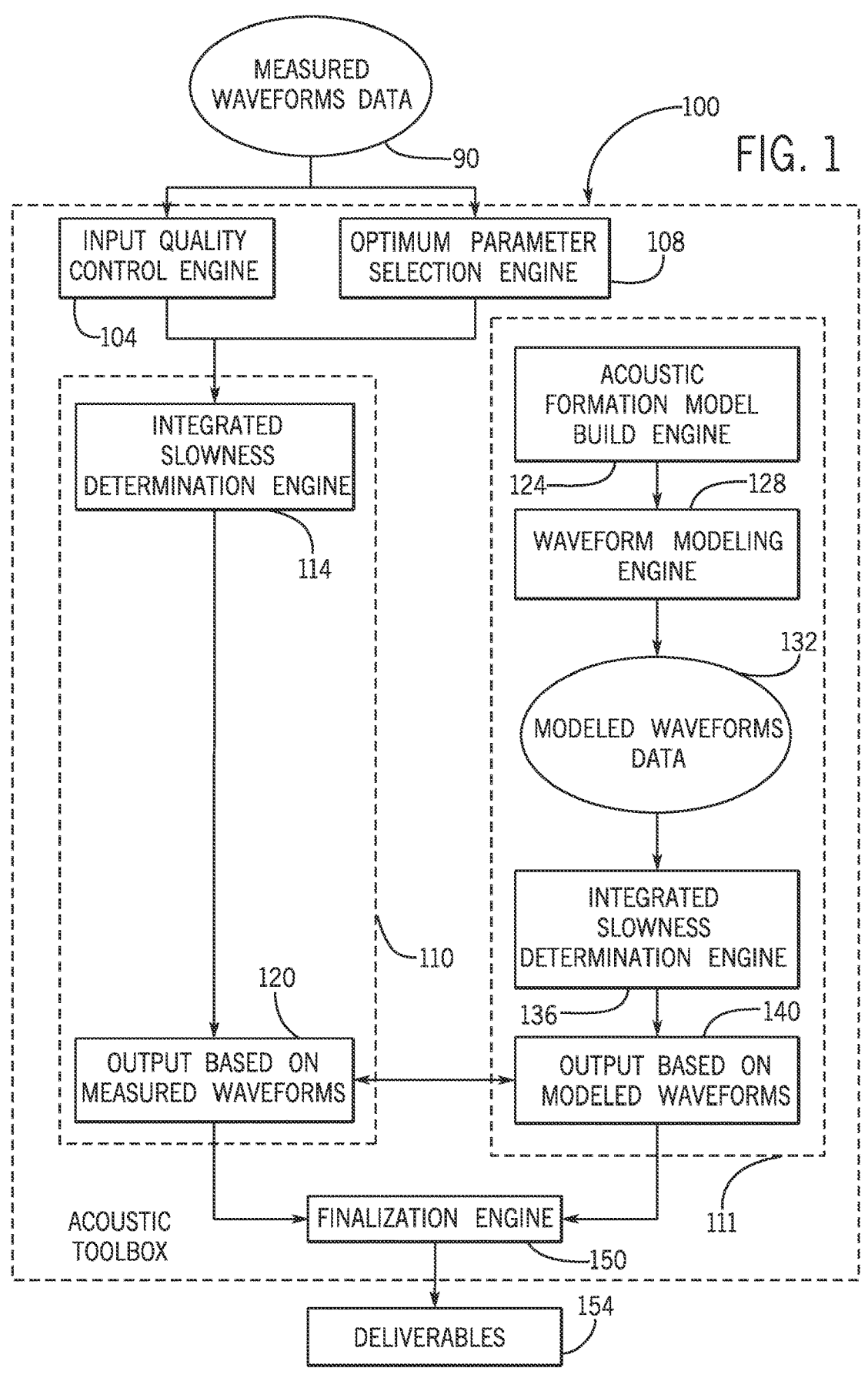
FIG. 1 is a schematic diagram of the acoustic tool box according to an example implementation.

Reference throughout the specification to "one embodiment," "an embodiment," "some embodiments," "one aspect," "an aspect," or "some aspects" means that a particular feature, structure, method, or characteristic described in connection with the embodiment or aspect is included in at least one embodiment of the present disclosure. Thus, the appearance of the phrases "in one embodiment" or "in an embodiment" or "in some embodiments" in various places throughout the specification are not necessarily all referring to the same embodiment. Furthermore, the particular features, structures, methods, or characteristics may be combined in any suitable manner in one or more embodiments. The words "including" and "having" shall have the same meaning as the word "comprising."

As used throughout the specification and claims, the term "downhole" refers to a subterranean environment, particularly in a well or wellbore. "Downhole tool" is used broadly to mean any tool used in a subterranean environment including, but not limited to, a logging tool, an imaging tool, an acoustic tool, a permanent monitoring tool, and a combination tool.

The various techniques disclosed herein may be utilized to facilitate and improve data acquisition and analysis in downhole tools and systems. In this, downhole tools and systems are provided that utilize arrays of sensing devices that are configured or designed for easy attachment and detachment in downhole sensor tools or modules that are deployed for purposes of sensing data relating to environmental and tool parameters downhole, within a borehole.

The tools and sensing systems disclosed herein may effectively sense and store characteristics relating to components of downhole tools as well as formation parameters at elevated temperatures and pressures. Chemicals and chemical properties of interest in oilfield exploration and development may also be measured and stored by the sensing systems contemplated by the present disclosure.

The sensing systems herein may be incorporated in tool systems such as wireline logging tools, measurement-while-drilling and logging-while-drilling tools, permanent monitoring systems, drill bits, drill collars, sondes, among others. For purposes of this disclosure, when any one of the terms wireline, cable line, slick line or coiled tubing or conveyance is used it is understood that any of the referenced deployment means, or any other suitable equivalent means, may be used with the present disclosure without departing from the spirit and scope of the present disclosure.

Moreover, inventive aspects lie in less than all features of a single disclosed embodiment. Thus, the claims following the Detailed Description are hereby expressly incorporated into this Detailed Description, with each claim standing on its own as a separate embodiment.

In accordance with example implementations, a microprocessor-based acoustic tool box may be used for purposes of processing and interpreting acoustic data that is acquired by a downhole sonic measurement tool. In this manner, in accordance with example implementations, the sonic measurement tool incudes one or multiple sonic sources that emit sonic energy and the downhole sonic measurement tool includes one or multiple sensors, or receivers, that acquire data representing acoustic energy that results from the emitted sonic energy. In this context, "sonic energy" refers to energy in the sonic frequency spectrum, which is emitted by one or multiple sonic sources and may be, in accordance with example implementations, energy between 0.5 and 30 kHz. The "acoustic energy" measured, or acquired, by the sonic measurement tool refers to energy sensed by one or multiple sensors, or receivers, of the tool due to interaction of the sonic energy emitted by sonic sources with the downhole environment (interaction with the wellbore, hydrocarbon bearing formations(s), geologic strata surrounding the wellbore, and so forth).

In general, the energy produced by the sonic measurement tool may travel through rock formations as either body waves or surface waves. The body waves include compressional waves, or P-waves, which are waves in which small particle vibrations occur in the same direction as the direction in which the wave is traveling. The body waves may also include shear waves, or S-waves, which are waves in which particle motion occurs in a direction that is perpendicular to the direction of wave propagation. The surface waves are borehole-guided waves, which are derived from internal reflections of the waves reverberating in the borehole. The borehole-guided, surface waves may include, for example, Stoneley waves.

The sonic measurement tool may include multiple sonic sources that are associated with multiple source classifications, or categories. For example, the sonic measurement tool may include one or multiple monopole sources. In response to energy from a monopole sonic source, the receivers of the sonic measurement tool may acquire data representing energy attributable to various wave modes, such as data representing P-waves, S-waves and Stoneley waves.

The sonic measurement tool may also include one or multiple directional sources, such as dipole or quadrupole sources, which produce additional surface waves, flexural mode for dipole and screw mode for quadrupole, which travel through the fluid in the borehole and along the fluid-formation interface. Data representing these surface waves may be processed for such purposes as determining the shear slowness in slow and anisotropic formations.

The speeds at which the aforementioned waves travel are affected by various properties of the downhole environment, such as the rock mechanical properties, density and elastic dynamic constants, the amount and type of fluid present in the formation, the makeup of rock grains, the degree of inter-grain cementation and so forth. Therefore, by measuring the speed of sonic wave propagation in the borehole, it is possible to characterize the surrounding formations based on sensed parameters relating to these properties. The speed, or velocity of a given sonic wave, or waveform, may be expressed in terms of the inverse of its velocity, which is referred to herein as the "slowness."

In this context, a "sonic wave" or "sonic waveform" may refer to a particular time segment of energy recorded by one or multiple receivers and may correspond to a particular sonic waveform mode, such as P-wave, S-wave, Stoneley wave, and so forth. Certain sonic waves are non-dispersive, or do not significantly vary with respect to frequency. Other sonic waves, however, are dispersive, meaning that the waves vary as a function of frequency. The acoustic tool box, in accordance with example implementations that are described herein, takes into account dispersive and non-dispersive waves.

In accordance with example implementations that are described herein, the acoustic tool box contains a graphical user interface (GUI). The GUI permits a user to organize an order in which the acoustic tool box processor acquired borehole acoustic data. In this manner, the user may use the GUI to organize the processing elements of the acoustic tool box according to a predefined workflow. As such, the processing is data driven, rather than model driven.

As described herein, in accordance with example implementations, the acoustic tool box allows a rigorous framework for processing acoustic data acquired representing monopole, dipole, Stoneley, quadrupole or any other types of waveforms that are recorded by the receivers of the acoustic tool. Moreover, for specific examples described herein, the acoustic tool box performs semblance time coherence (STC) processing, although in accordance with further example implementations, the workflow is not necessarily limited to STC processing. As also described herein, the acoustic tool box may be used to perform advanced inversion to obtain shear from quadrupole and dipole waveforms as well as for Stoneley and any other wave modes that are sensed and recorded by an acoustic tool.

In accordance with example implementations that are described herein, the acoustic tool box may be also used for purposes of integrating the comparison of slowness estimates derived from both measured and modeled waveform data. In this manner, in accordance with example implementations, the acoustic tool box may be used to generate slowness estimates for different wave modes based on data representing the waveforms measured by the sonic measurement tool; and the acoustic tool box may also allow the formation to be modeled, so that the toolbox may be used to perform forward modeling to derive modeled waveforms from which the toolbox may generate another set of slowness estimates. The acoustic tool box may display comparisons of the slowness estimates derived from the measured and modeled waveforms so that multiple iterations may be performed by the user to accurately model the formation and ultimately improve the slowness estimates, as further described herein.

Figure 2:
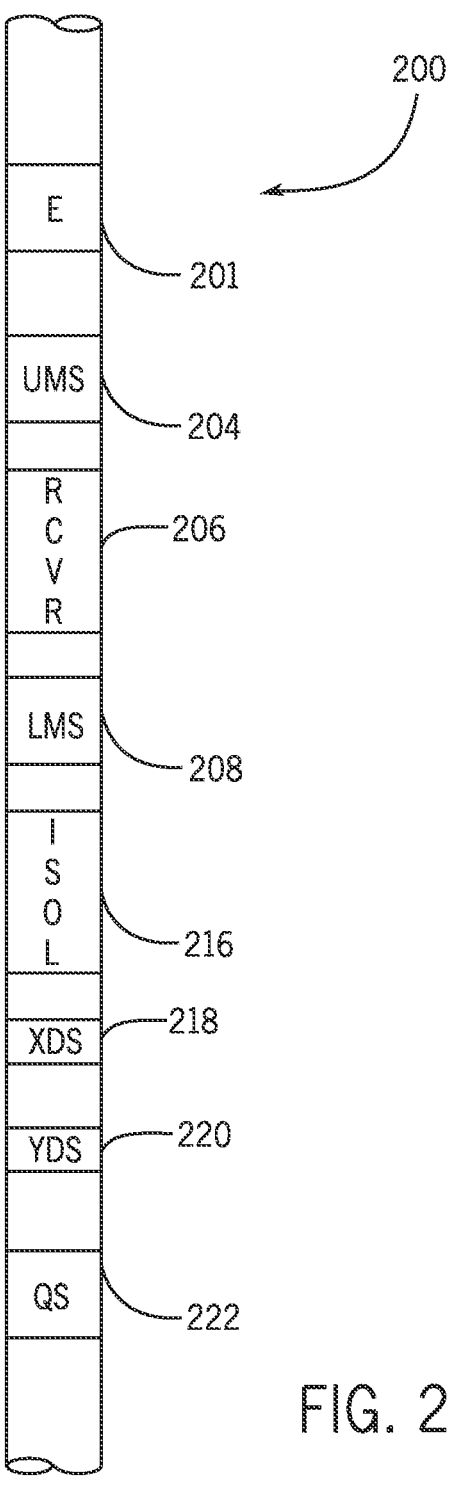
FIG. 2 is a schematic diagram of a downhole sonic measurement tool according to an example implementation.

As a more specific example, FIG. 1 depicts an acoustic tool box 100 in accordance with example implementations. The acoustic tool box 100 receives and processes measured waveform data 90, which may be acquired by a sonic measurement tool. Referring to FIG. 2 in conjunction with FIG. 1, an example sonic measurement tool 200 may be deployed downhole in a wellbore and may include one or multiple receiver arrays 206, which acquire data representing energy measured in response to emissions by one or multiple sonic sources of the tool 200.

The sonic measurement tool 200 may be deployed downhole in a wellbore using many types of conveyance mechanisms, such as a wireline, slick line, coiled tubing, drill string and so forth. In this context, an "engine" refers to a machine or machine component that performs certain actions. The "engine" may be, for example, a software or a software module that is executed by a microprocessor, hardwired circuitry, an application specific integrated circuit (ASIC) and so forth. The sonic measurement tool 200 may be deployed as part of the drill string when drilling a well and may be deployed at any other element during the testing completion or production elements of the well.

As an example, the sonic sources may include sonic sources that are disposed near the receiver array 206, such as an upper monopole sonic source 204 that is disposed up hole of the receiver array 206 and a lower monopole source 208 that is disposed downhole of the receiver array 206.

As depicted in FIG. 2, the sonic tool 200 may include a sonic isolation joint 216 between the receiver array(s) 206 and far sonic sources of the tool 200. In accordance with example implementations, the far sonic sources may include directional sonic sources, such as an X-dipole source 218 aligned with the inline direction of the tool 200, a Y-dipole sonic source 220 aligned with the crossline direction (i.e., orthogonal to the inline direction) and a quadrupole sonic source 222, which emits sonic energy in four directions. The sonic measurement tool 200 may include various other components, such as electronics 201 to control the sources and recording of data by the receivers 206, control telemetry communications with equipment at the Earth surface, and so forth.

Referring to FIG. 1, in accordance with example implementations, the acoustic tool box 100 includes an input quality control engine 104, which analyzes the measured waveform data 90 to perform an initial quality control check on the data. Moreover, an optimum parameter selection engine 108 of the acoustic tool box 100 is connected to a GUI 101 of the toolbox 100 for purposes of allowing a user to select the job parameters that are used in the processing (STC processing, for example) by the toolbox 100 to determine the slowness estimates. These parameters may be low level parameters or may be high level parameters with the optimum parameter selection engine 108 providing automatic calculation of the lower level parameter from basic well information, as further described herein.

From the job parameters, an integrated slowness determination engine 114 of the acoustic tool box 100 may then be used to perform integrated slowness determination and tracking. The integrated slowness determination process, in accordance with example implementations, involves simultaneously non-dispersive and dispersive wave processing, as well as multiple shot evaluation. The tracking process uses a statistical technique to associate semblance peaks to slowness curves for the wave modes that are evaluated and provide an output 120 based on the measured waveforms. The output 120 may, for example, data that represents a coherence plot, along with an associated error. As depicted in FIG. 1, the output 120 is generated as part of a processing path 110 that is associated with processing the measured waveform data 90.

As also depicted in FIG. 1, in accordance with example implementations, the acoustic tool box 100 also has a processing path 111 to determine slowness values from modeled waveform data 132. In this manner, the Acoustic tool box 100 includes an engine 124 for building an acoustic formation model. The acoustic formation model may be constructed based on a knowledge of the formation and borehole geometry, as further described herein.

Based on the model, a waveform modeling engine 128 of the Acoustic tool box 100 may use forward modeling to produce the modeled waveform data 132, representing waveforms that are expected to be measured by the sonic measurement tool. An integrated slowness determination engine 136 (which may be the same as engine 114, in accordance with some implementations) of the acoustic tool box 100 may then be used to perform an integrated slowness determination for purposes of producing an output 140, or data that represents slowness values and associated errors based on the modeled waveforms 132.

A finalization engine 150 of the acoustic tool box 100 may be used to compare the outputs 120 and 140 and then finalize the processing outputs. In this manner, in accordance with example implementations, the finalization engine 150 may produce a display, allowing the user to select the best slowness outputs and associated errors from the measured 110 and the modeled 111 processing paths so that deliverables 154 (e.g., finalized slowness logs) may be produced.

In accordance with example implementations, the optimum parameter selection engine 108 allows, through the GUI 101, the selection of the job parameters using one of two processing modes: a standard mode and an expert mode. In the standard mode, the user provides a relatively few high level parameters, or "standard parameters." The optimum parameter selection engine 108, in turn, automatically determines the STC parameters (used by the engines 114, 124, 128 and 136, for example) from the user-provided high level parameters. In the expert mode, the user, via the GUI 101, provides the low level parameters.

In accordance with an example implementation, the high level parameters may include the following: a tool type and source firing mode; a hole size; a mud slowness; and a formation type. These parameters may be determined from basic well information without the need for expert user information.

Regarding the formation type, or category, in accordance with example implementations, relatively precise information is not needed. In this manner, as explained in U.S. Pat. No. 6,654,688 (herein called the "688 Patent"), entitled, "PROCESSING SONIC WAVEFORM MEASURE-MENTS," which issued on Nov. 25, 2003, and is hereby incorporated by reference in its entirety, the formation may be classified as belonging to one of five basic formation categories. As explained in the '688 Patent, in accordance with some implementations, the formation categories may be the following: fast, intermediate, slow, very slow and extremely slow formation types. Each type is defined by the minimum and maximum expected value for the compressional slowness and the Vp/Vs ratio. Moreover, sufficient overlap may be made between neighboring formation category types to allow for a smooth transition between different formation categories and to provide stability for the processing.

Because the basic job information is unambiguous, the choice of the parameters becomes unique for a given interval, and the same data processed by different users in different locations yields the same final answers. In the standard mode, the user does not have access to the low level parameters, i.e., this is a closed process. If for some special reason, the low level parameters are to be modified, the acoustic tool box 100 may be accessed in the expert mode, a mode in which the GUI 101 allows entry of the low level parameters.

In accordance with example implementations, a set of rules is used by the optimum parameter selection engine 108 to automatically determine the STC processing parameters. These rules may be derived from a compilation of the experience of expert analysis and from sonic propagation physics, and can be appreciated by one of ordinary skill in the art. For example, in accordance with example implementations, the frequency of the signal for dipole waveforms is a function of the formation type and the borehole size. For example, starting above 3 kHz in fast formation to small boreholes, the frequency may be reduced below 1 kHz in slow formations and large boreholes. The knowledge of the signal frequency drives the choice of the frequency filter and the integration for semblance processing. Similar logic may be applied for quadrupole waveforms or waveforms of higher modes (hexapole, octapole, and so forth).

The optimum parameter selection engine 108 may also automatically determine the range of slowness and arrival time values investigated with the semblance processing as a function of the formation type, the transmitter-to-receiver spacing and to a lesser extent, the mud slowness and the borehole size.

In accordance with example implementations, the tracking process as a component in the integrated slowness determination engine 114 selects a probability model (from multiple candidate probability models) that is used to track and classify semblance peaks to generate slowness logs, based on the type of waveforms/waveform modes and the formation type.

In accordance with example implementations, the integrated slowness determination engine 114 applies STC-based processing for purposes of estimating the slownesses. In general, STC processing involves full waveform analysis to find all propagating waves in an array of sonic waveforms. In the context of this application, "STC processing" generally refers to all types of STC-based processing, such as dispersive STC processing in which the slowness is a function of frequency, non-dispersive STC processing in which slowness is constant with respect to frequency, multi-shot STC processing, fast STC processing, and so forth. These types of processing are generally described in the '688 Patent. The dispersive STC processing is generally outlined below.

In the dispersive STC processing technique, the waveforms are back-propagated by their model dispersion curve in the frequency domain before computing semblance in the time domain. However, as the dispersion curves depend on the slowness of the formation, the semblance computation is performed for a series of the shear slowness values. The shear slowness is then determined based on the maximum semblance.

In accordance with example implementations, the integrated slowness determination engine 114 back-propagates the waveforms by every dispersion curve corresponding to every slowness analyzed in the semblance computation. Although this is a relatively complex procedure, complete consistency is achieved between the dispersion correction and the slowness determination.

Using the full waveform array to perform the computation causes the vertical resolution to be the array length, typically 6 ft for a 13-receiver array, while most other logs have a resolution of about 2 ft. Also, the presence of a bed boundary in the interval covered by the array results in low coherence and erratic peaks that are difficult to classify later. In accordance with example implementations, the integrated slowness determination engine 114 uses multi-shot STC processing as a solution.

Using sub-arrays of receivers (five, for example) to compute semblance yields a vertical resolution better than or equal to 2 ft. To compensate for the reduction in signal-to-noise (S/N) ratio and accuracy caused by the reduced array length, results from various sub-arrays obtained at different shot positions over the same interval are averaged. In accordance with example implementations, as described in the STC processing discussed in the '688 Patent, the integrated slowness determination engine 114 combines the results from multiple receiver sub-arrays as follows: the engine 114 stacks the coherence values from multiple sub-arrays in the slowness-time (ST) plane after applying a time correction to compensate for the change in transmitter-receiver spacing. The semblance peaks obtained from stacked ST-plane are then defined both in slowness and in arrival time.

Thus, in accordance with example implementations, the integrated slowness determination process used by the integrated slowness determination engine 114 incorporates the semblance computation with dispersive and multi-shot processing. All waveform types may therefore be processed uniformly. Non-dispersive waves may be evaluated with non-dispersive slowness curves, i.e., curves with a constant, or flat response with respect to frequency. The vertical resolution of the processing may be adjusted by selecting the number of receivers in the multi-shot sub-arrays. In accordance with example implementations, the process outputs the slowness uncertainty (error bar), the signal to noise (S/N) ratio, the frequency content and the mean frequency of each waveform mode/calibration that is evaluated.

In accordance with example implementations, the integrated slowness determination engine 114 applies a two-parameter inversion for formation shear and environmental slowness to mitigate errors due to input parameter inaccuracies and model errors (i.e., to mitigate errors due to, for example, a non-homogeneous isotropic formation, such as a TI formation and/or altered formation).

In accordance with example implementations, the integrated slowness determination engine 136 performs the same STC-based processing on the modeled waveform data as the integrated slowness determination engine 114 performs on the measured waveform data. In accordance with some implementations, the acoustic tool box 100 may contain a single integrated slowness determination engine that performs determinations of the slowness estimates for both the measured and modeled waveforms. Thus, many implementations are contemplated, which are within the scope of the amended claims.

In accordance with example implementations, the integrated slowness determination engine 114/136 performs a quality control analysis of the estimated slownesses. More specifically, in accordance with some implementations, the integrated slowness determination engine 114/136 performs a slowness frequency analysis (SFA). To generate a slowness-frequency projection log, a dispersion curve is first generated at each depth from the recorded waveforms. Then, the slowness versus frequency information of the dispersion curve is projected onto the slowness axis, and the slowness projection at each depth is plotted as a log versus depth.

The estimated slowness log from time-based coherence processing is next overlaid on the SFA projection. For dipole flexural signals, if the estimated slowness log lies at the lowest limit of the SFA projection, then the estimated slowness matches the low frequency limit of the dipole flexural signal, and the slowness log is correct. The log is correct because it is consistent with the dispersion curve that describes the data. SFA is a standard QC both in DCS and wellsite processing. After all processing is complete; a cross-plot of the Vp/Vs ratio versus compressional slowness is built as a final check of the quality of the outputs.

The modeled waveform-based processing path 111 of the acoustic tool box 100 integrates modeling capability in the processing and interpretation. In this manner, by having measured 110 and modeled 111 processing paths, the acoustic tool box 100 allows processing and interpretation in complex conditions, such as deviated/horizontal wells, strong anisotropy formations, for example, a deviated well in a shale formation) and in open/cased holes.

Figure 3:
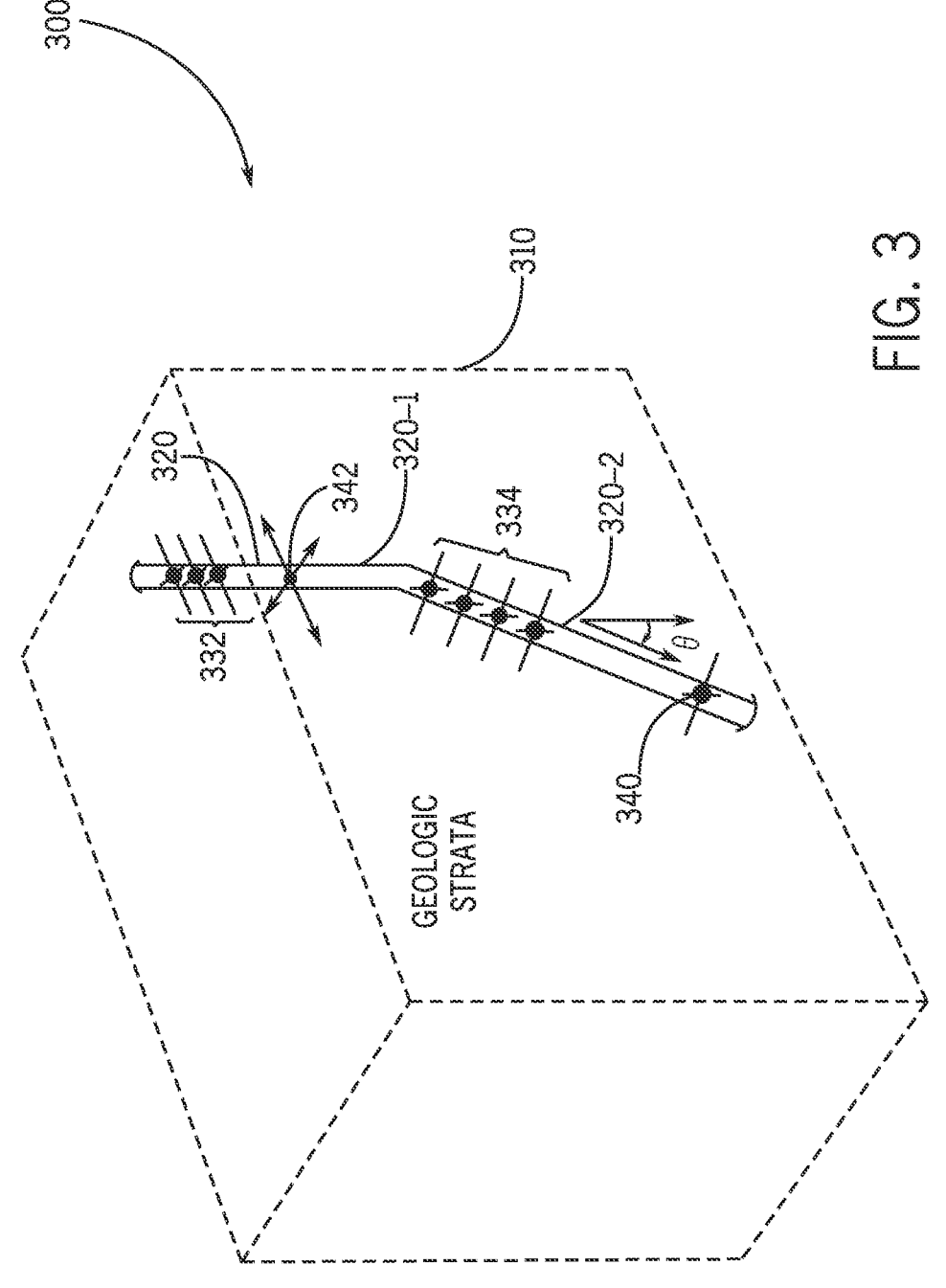
FIG. 3 is an illustration of a well according to an example implementation.

Referring to FIG. 3 in conjunction with FIG. 1, an example well 300 may include a wellbore 320 that includes a vertical interval 320-1, as well as a deviated interval 320-2, that is deviated from vertical by an angle Θ. As shown in FIG. 3, for this example, the well 300 assumes certain locations for dipole receivers 332 and 334 as well as certain locations for dipole sources 340. Moreover, characteristics of a liquid 311 in the wellbore 320 are assumed.

The workflow used in connection with the modeled waveform-based processing path 111 may proceed as follows. First, the user may readily set up a formation model based on field log data and based on results derived about the formation and well based on measured data. As an example, the formation model may be set up using the GUI 101. Moreover, using the GUI 101, the user may execute the waveform modeling engine 128 for purposes of generating the modeled waveforms 132. The integrated slowness determination engine 136 may then determine the slowness estimates and errors (i.e., the output 140). The finalization engine 150 of the acoustic tool box 100 may then display the outputs 120 and 140 for comparison by the user so that the user may readily compare the results obtained from the two processing paths 110 and 111. The user may reiterate the above steps for purposes of finalizing the interpretation of the sonic tool measurement data. This function vastly facilitates the interpretation of sonic data in complex conditions and allows improving processing parameters, hence, processing results, and the quality of the logs that are provided.

In accordance with example implementations, the acoustic tool box 100 allows the user to define the processing elements of the acoustic tool box 100 such as the processing elements used by the integrated slowness determination engines 114 and 136, and the order in which these elements process the data, based on a user-defined workflow. In this manner, using the GUI 101, a user may decouple the implementation of the processing elements from the workflow. Such design facilitates development and deployment thereby making the acoustic tool box 100 easily extendable, thereby allowing incorporation of new acoustic algorithms to field users.

In accordance with some implementations, the acoustic tool box 100 provides a predefined set of workflows with integrated business logic for less experienced users while allowing a relatively high level of customization for relatively experienced users. Performance improvements in the form of execution speedup for custom acoustic workflows and the final result optimization capabilities in case of custom workflows are obtained.

Figure 4:
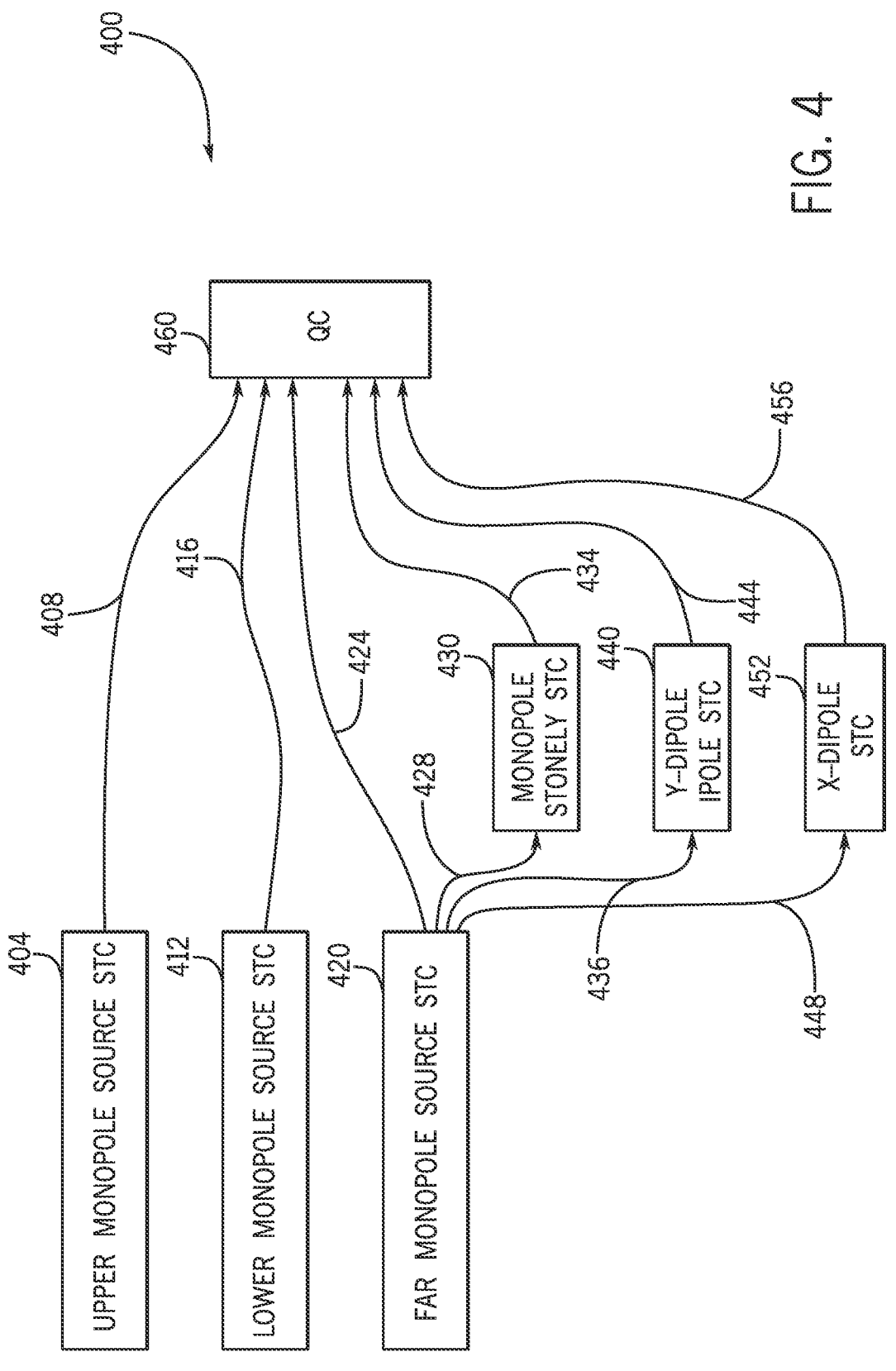
FIG. 4 is an illustration of the use of a graphical user interface (GUI) of the acoustic tool box to organize acoustic data processing elements according to a user-defined work-flow according to an example implementation.
Figure 5:
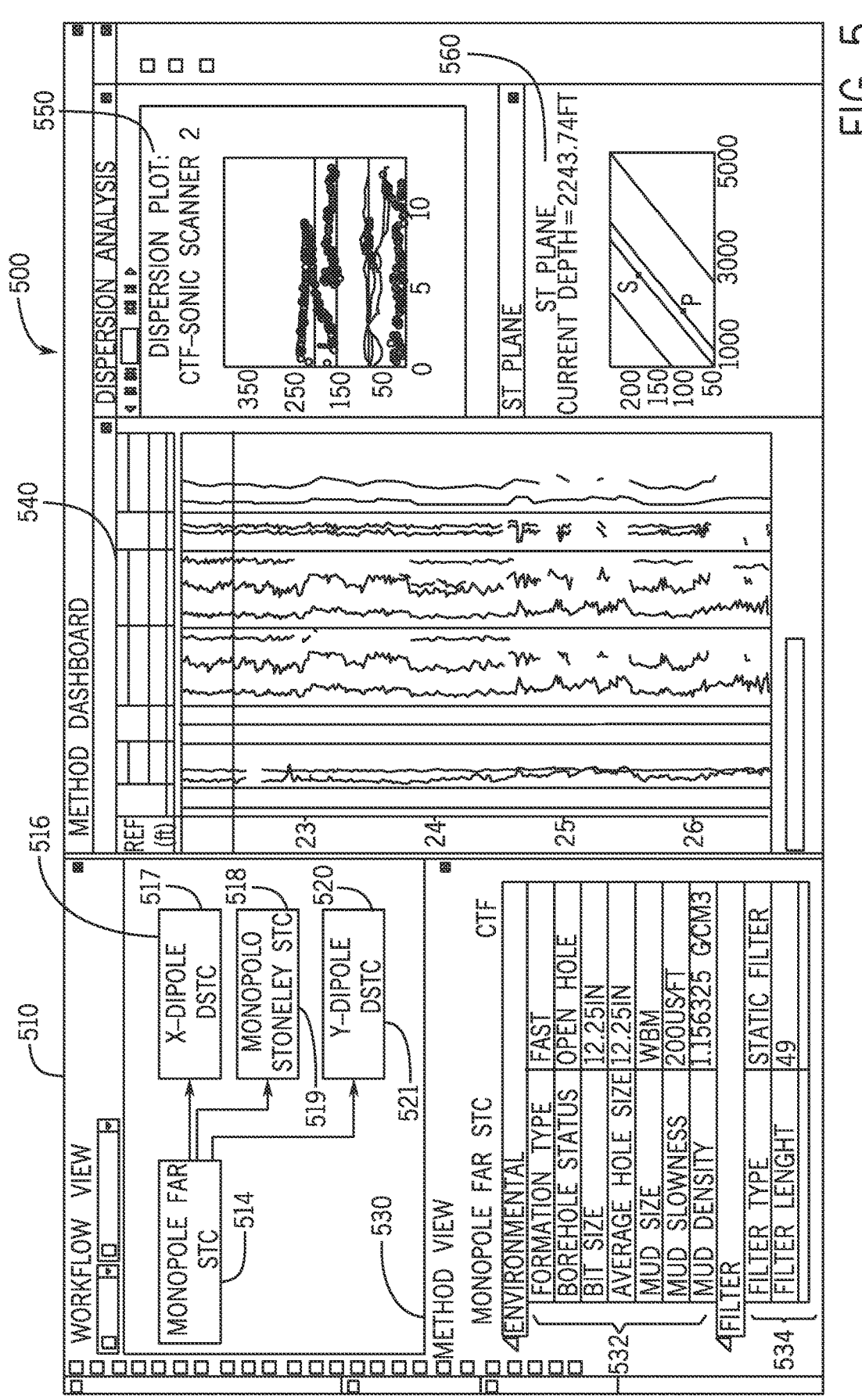
FIG. 5 illustrates the GUI providing multiple views according to an example implementation.

For purposes of allowing the user to customize the processing by the acoustic tool box 100, the GUI 101 displays different views of the processing setup: a graphical, or diagram-like, view (such as example view 400 depicted in FIG. 4), a Method view (depicted in FIG. 5), a Workflow view (depicted in FIG. 5) and a Log view (depicted in FIG. 5).

More specifically, FIG. 4 depicts an example graphical view 400 illustrating processing elements and a processing order. Selection of the processing elements; parameters for the processing elements and the workflow; and the chain of the processing elements may be controlled by a user through the GUI 101. For example, the user may open a scroll down list of the GUI 101 to select a given processing element for inclusion in the workflow; mouse click on a given processing element to open a window to select parameters for the element; drag processing elements across the screen to selectively combine inputs and outputs of the processing elements; and so forth.

In this manner, as illustrated in FIG. 4 for this example, the sonic data is first processed in parallel by an upper monopole source STC process 404, a lower monopole source STC process 412 and a far monopole source STC process 420. The user, through the GUI 101, may set the filtering and other parameters pertaining to these processing elements. Moreover, as depicted in FIG. 4, for this example, the results from the upper monopole source STC process 404 and lower monopole source STC process 412 are provided to a quality control stage 460, as indicated by corresponding arrow 408. The outputs from the far monopole source STC process 420, in turn, are provided to the quality control stage 460 (as indicated by arrow 424) as inputs to a monopole Stoneley STC processing element 430 (arrow 428), a Y-dipole STC processing element 440 (arrow 436) and X-dipole STC processing 452 (arrow 448). Outputs from these processing elements, in turn, are provided to the quality control stage 460, as indicated by corresponding arrows 434, 444 and 456.

Referring to FIG. 5, in accordance with some implementations, the GUI 101 provides example views 500. As shown, the views 500 include a workflow view 510 showing STC-based processing 514, 518 and 520 along with respective status indicators 515, 517 and 521 showing the processing statuses of these elements; and a method view 530, showing the parameters for a given processing element. In this manner, for the example depicted in FIG. 5, the method view 530 depicts environmental 532 and filtering 534 parameters for a monopole far STC processing element 514 depicted in the workflow view 510. Other parameters (e.g., the selection of parameters for a Monte Carlo analysis) may be selected for the processing element 514; and, in accordance with example implementations, the method view 530 may be further manipulated by the user to select parameters for the other processing elements 516, 518 and 520.

FIG. 5 also depicts a log view 540 for a selected interval of the well, as well as a dispersion plot 550 and STC plane 560 for a selected depth of the well.

Referring to FIG. 6A, in accordance with example implementations, the GUI 101 may provide an interface 600 to allow selection (as indicated at reference numeral 632) to designate whether certain processing elements may be executed in parallel. In this regard, for this example, elements 610, 612 and 614, may, for example, execute in parallel. Moreover, for this example, element 620, which depends on the output from element 614 may, in accordance with example implementations, not begin until element 614 executes. FIG. 6B depicts an example interface 640 for the GUI 101 showing interactive execution among processing elements 643, 645 and 646. For this example, the interface 646 depicts execution process statuses of the elements as well as the number of outputs provided by the elements. FIG. 6C depicts an example interface 660 of the GUI 100 to allow selection of the well interval (via a sliding bar) that is analyzed.

Figure 7:
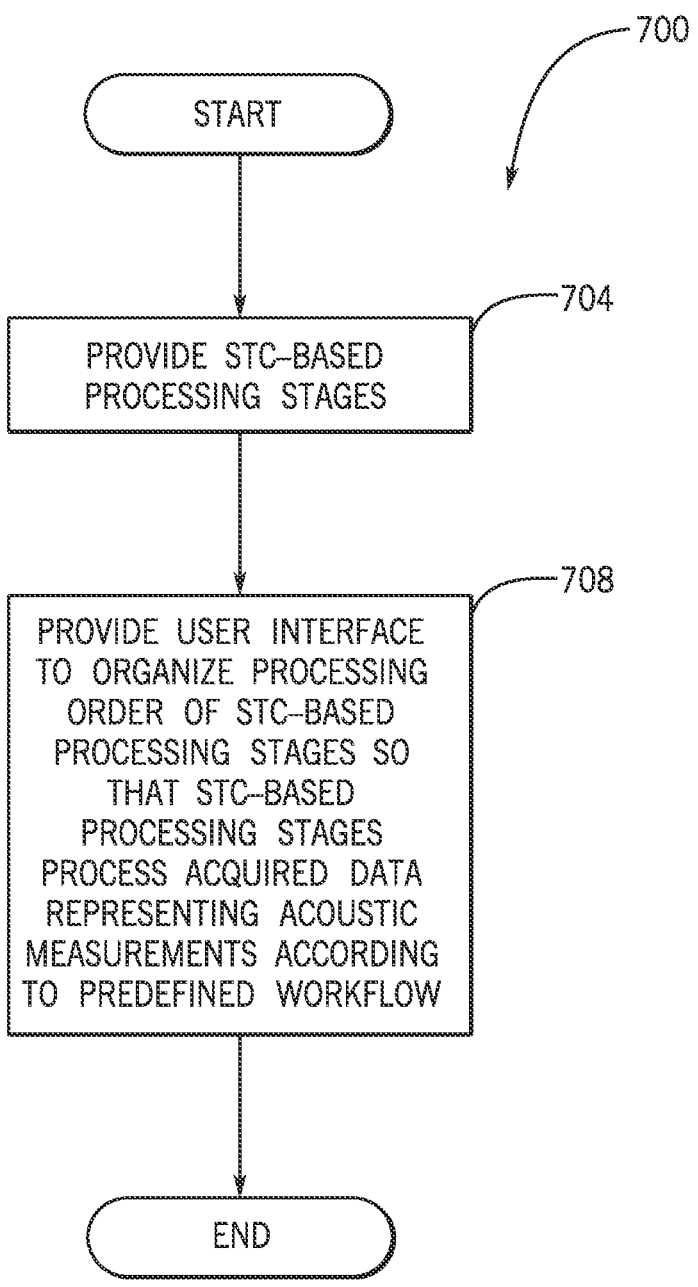
FIG. 7 is a flow diagram illustrating a technique to organize a chain of slowness time coherence (STC)-based processing elements to correspond to a user-defined work-flow according to an example implementation.

Thus, referring to FIG. 7, in accordance with example limitations, a technique 700 includes providing (block 704) STC-based processing elements and providing (block 708) a user interface to organize a processing chain of the STC-based processing elements so that the STC-based processing elements process acquired data representing acoustic measurements according to a predefined workflow.

Figure 8:
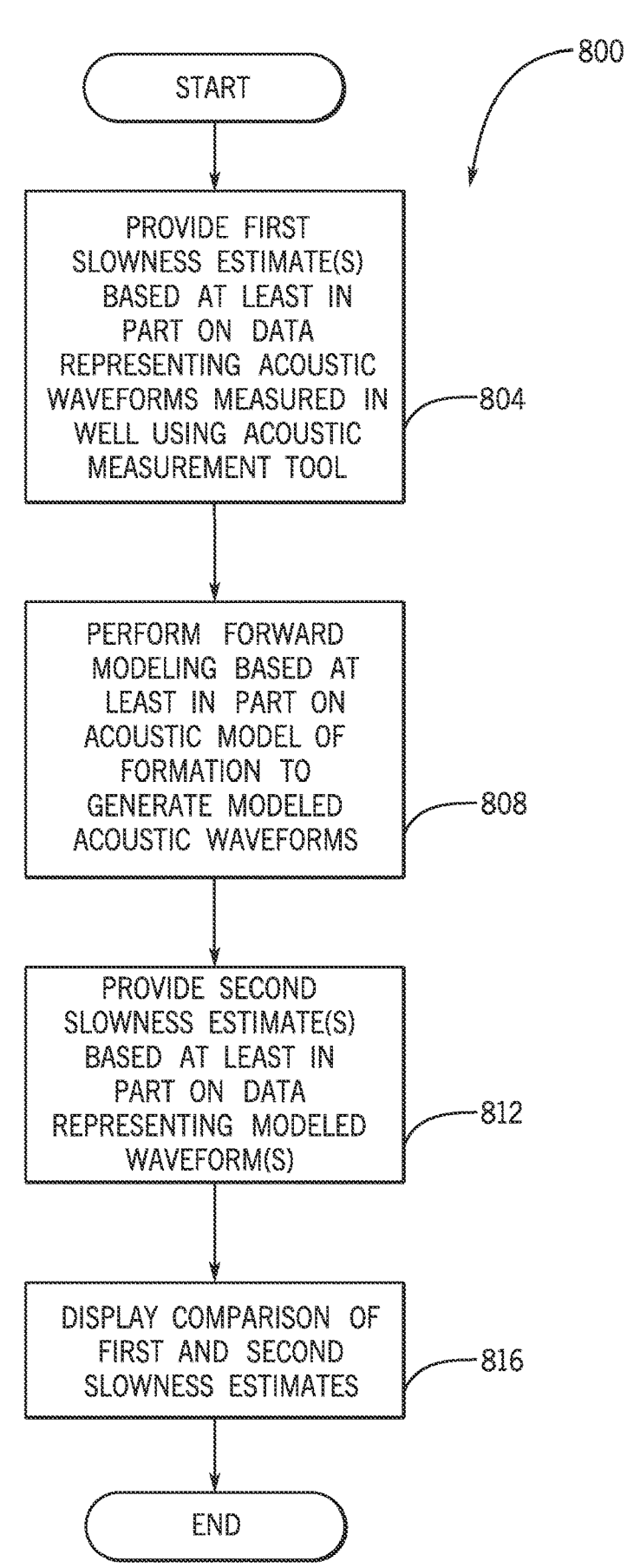
FIG. 8 is a flow diagram depicting a technique to deter-mine and compare slowness estimates derived from mea-sured and modeled waveforms according to an example implementation.

Moreover, referring to FIG. 8, in accordance with example limitations, an acoustic tool box 100 allows a technique 800, which includes providing (block 804) one or multiple first slowness estimates based at least in part on data representing acoustic waveforms measured downhole in the well using an acoustic measurement tool. The technique 800 also includes performing (block 808) forward modeling at least in part on the acoustic model of the formation to generate modeled acoustic waveforms. The technique 800 includes providing (block 812) one or multiple second slowness estimates based at least in part on the modeled waveforms and displaying (block 816) a comparison of a first and second slowness estimates.

Figure 9:
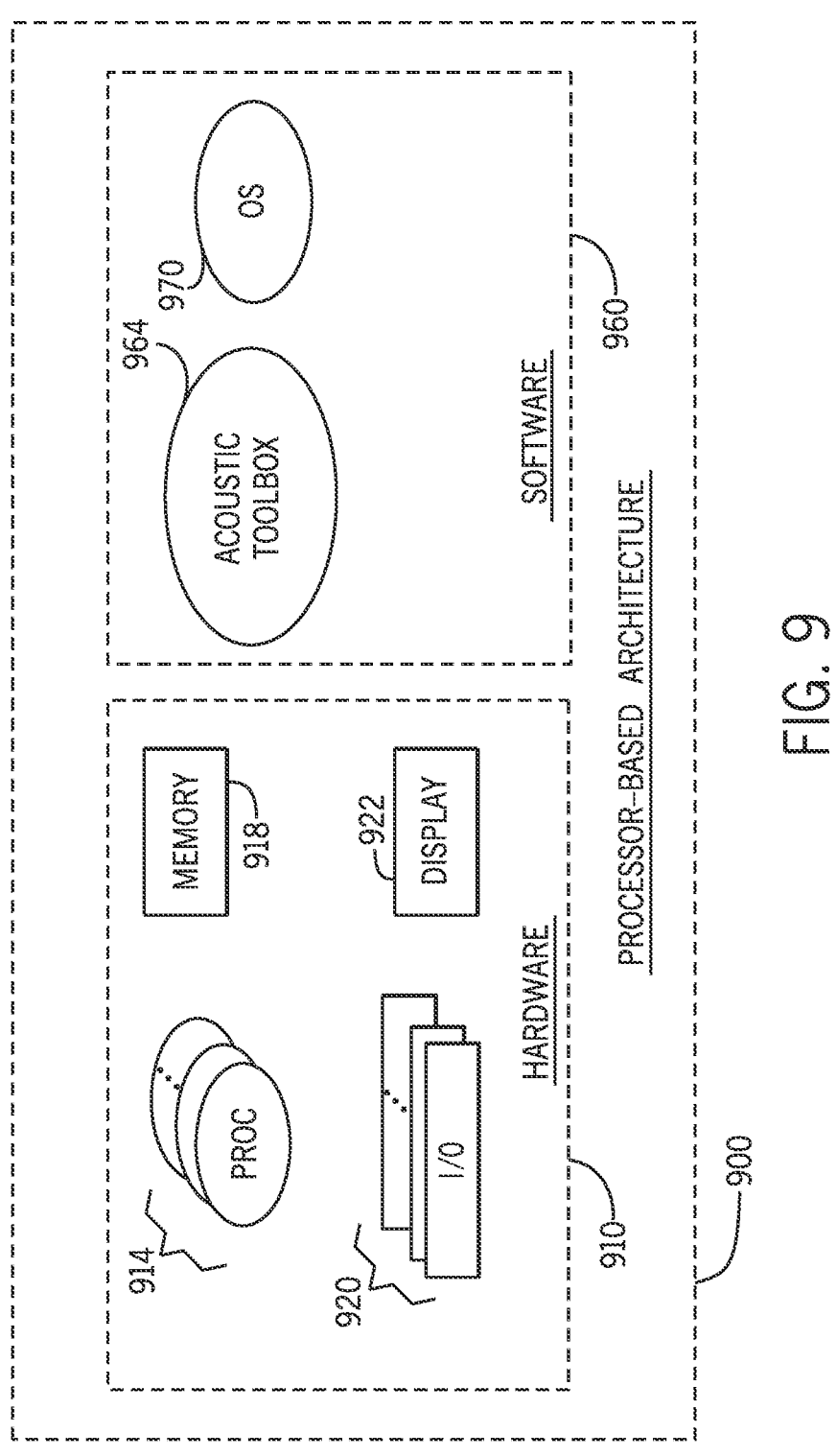
FIG. 9 is a schematic diagram of a processor-based architecture according to an example implementation.

In accordance with some implementations, the acoustic tool box 100 may be formed by executing machine-executable instructions, of "software," on a processor-based architecture 900. In this context, the "processor-based architecture" refers to one or multiple actual physical machines (i.e., one or multiple servers, clients, desktop computers, rack-based computers, and so forth). Although FIG. 9 depicts the processor-based architecture 900 as being contained in a single box, it is noted that the components of the processor-based architecture 900 may be disposed locally at a single geographic location, may be disposed at geographically-distributed processing locations, and so forth. In accordance with some implementations, the processor-based architecture 900 may be formed from one of multiple processing clusters.

Regardless of its particular form, the processor-based architecture 900 represents one or more actual, physical machines that include hardware 910 and machine executable instructions, or software 960. The hardware 910 includes one or multiple processors 914 (one or multiple central processing units CPUs, CPU processing cores and so forth). In addition to the processors 914, the hardware 910 may include a memory 914, one or multiple inputs/outputs (I/O) devices 920, a display 922 (a monitor or screen, for example), and so forth.

The memory 918, in general, is a non-transitory storage medium that may store, as examples, preliminary, final or intermediate processing data used by the acoustic tool box 100, machine-executable instructions that are executed by the processors 914 for purposes of implementing one or more of the techniques that are described herein, data representing job parameters, data representing workflows, data representing processing element configuration, and so forth. The memory 918, may be formed from semiconductor storage devices, memristors, magnetic storage devices, phase change memory devices, a combination of one or more of these storage technologies and so forth, depending on the particular implementation.

In accordance with example implementations, software 960 of the processor-based architecture 900 may include instructions 964 that when, executed by the processors 914, cause the architecture 900 to provide an acoustic tool box, and one or multiple techniques that are described herein. Moreover, the software 916 may include additional instructions, such as, for example, instructions 970 that are executed by the processors 915 to provide an operating system, and so forth.

Figure 10:
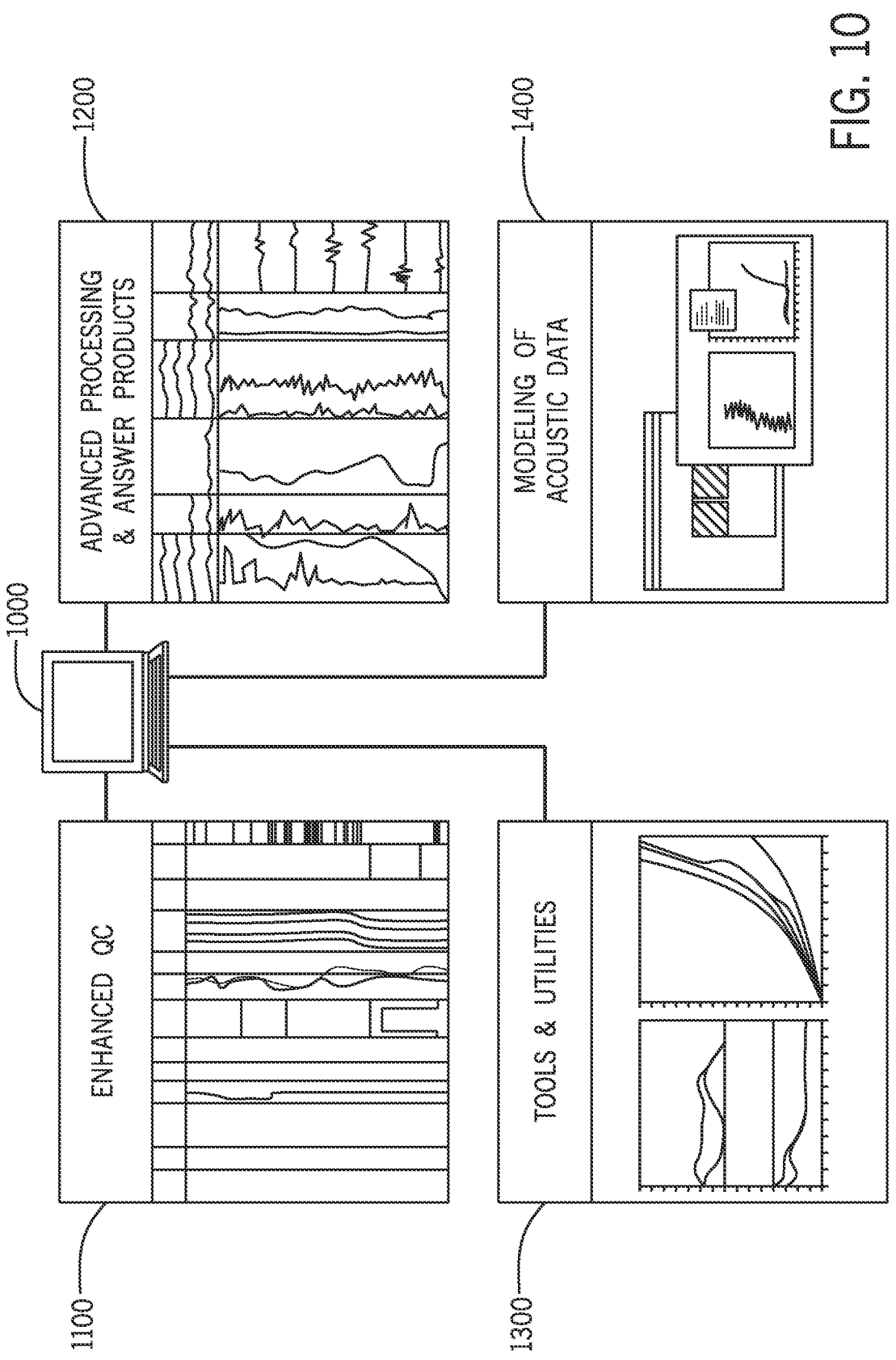
FIG. 10 is a general illustration of acoustic tool box elements, according to an embodiment of the disclosure.

In another exemplary implementation, a workflow-based acoustic processing system is shown in FIG. 10. This figure shows a general illustration of acoustic tool box elements according to an exemplary implementation. In this implementation, acoustic tool box elements comprising a computer system 1000, which includes four general areas of processing and control: (1) enhanced quality-control 1100 (QC) for basic processing, (2) advanced processing and answer products 1200, (3) new processing tools and utilities 1300 and (4) modeling of acoustic data 1400 for interpretation in complex conditions. In some situations, the complex conditions may include deviated/horizontal wells and/or anisotropic/fractured formations. However, the modeling of acoustic data 1400 may involve other types of modeling a user wishes to perform (e.g., open or cased hole). These general areas are considered as acoustic tool box elements used to ensure proper acoustic data processing irrespective of conditions (deviated wells etc.).

In accordance with further example implementations, all or part of the above-described processor-based architecture may be replaced by dedicated, hardwired circuitry or an application specific integrated circuit (ASIC). Thus, many implementations are contemplated, which are within the scope of the dependent claims.

In accordance with example implementations, the techniques and systems that are described herein may provide one or more of the following advantages. The systems and techniques may provide efficiency due to parallel execution, batch execution, interactive execution, pipelining and remote execution. Moreover, the systems and techniques may provide robustness, in that independent tasks do not interfere, easy recoverability is provided and stability is provided. The systems and techniques may provide flexibility, in that the workflow is easily customizable, parameters are shared, parameter types are interchangeable (constant, property, log and so forth) and the processing may be run, paused and restarted.

The systems and techniques that are described herein provide effective quality control in that the quality control stages may be part of the workflow, the support customized plots, plots may be integrated into processing work steps and variations may be performed (multiple executions based on list parameter values or automatic tuning to optimal parameter values) and support for Monte Carlo analysis may be used in sonic workflows. The systems and techniques that are described herein offer traceability, in that it is relatively easy to visualize all parts of the workflow, processing dependencies may be visualized, processing/input/parameters/output relationships are recoverable and the interpretation may be traceable by having all quality control elements and deliverables as a part of the workflow. Other and different advantages may be achieved in accordance with further example implementations.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:

acquiring data representing acoustic waveforms measured downhole in a well using an acoustic measurement tool; and providing a user interface in communication with a computer in communication with a non-transitory computer readable storage medium that stores instructions that when executed by the computer cause the computer to:

provide a first slowness estimate for a formation based at least in part on the data representing acoustic waveforms measured downhole in a well using the acoustic measurement tool, wherein the first slowness estimate comprises a first slowness value and a first error value;

perform forward modeling, via a waveform modeling engine based at least in part on an acoustic model of the formation, to generate modeled acoustic waveforms; and provide a second slowness estimate based at least in part on the modeled acoustic waveforms, wherein the second slowness estimate comprises a second slowness value and a second error value.

2. The method of claim 1, wherein the storage medium storing instructions that when executed by the computer cause the computer to perform slowness frequency analysis-based quality control.

3. The method of claim 1, wherein the storage medium storing instructions that when executed by the computer cause the computer to provide the user interface for a user to enter a formation type for acoustic processing.

4. An article comprising a non-transitory computer readable storage medium to store instructions that when executed by a computer cause the computer to:

provide at least one first slowness estimate for a formation based at least in part on data representing acoustic waveforms measured downhole in a well using an acoustic measurement tool, wherein the at least one first slowness estimate comprises a first slowness value and a first error value;

perform forward modeling, via a waveform modeling engine based at least in part on an acoustic model of the formation, to generate modeled acoustic waveforms; and providing at least one second slowness estimate based at least in part on the modeled acoustic waveforms, wherein the at least one second slowness estimate comprises a second slowness value and a second error value.

5. The article of claim 4, the storage medium storing instructions that when executed by the computer cause the computer to perform slowness frequency analysis-based quality control.

6. The article of claim 4, the storage medium storing instructions that when executed by the computer cause the computer to provide a user interface for a user to enter a formation type for acoustic processing.

7. The article of claim 4, the storage medium storing instructions that when executed by the computer cause the computer to provide a graphical user interface to allow selection between automatically calculating parameters for acoustic processing or allowing a user to, in an expert mode, provide the parameters.

8. The method of claim 1, wherein the storage medium storing instructions that when executed by the computer cause the computer to:

display a comparison of the first slowness estimate and the second slowness estimate.

9. The method of claim 2, wherein the storage medium storing instructions that when executed by the computer cause the computer to:

generate a log comprising a dispersion curve at each depth from the acoustic waveforms.

10. The method of claim 9, wherein the storage medium storing instructions that when executed by the computer cause the computer to:

project the dispersion curve onto a slowness axis, wherein a slowness projection at a depth is displayed as a log versus the depth.

11. The article of claim 4, the storage medium storing instructions that when executed by the computer cause the computer to:

generate a log comprising a dispersion curve at each depth from the acoustic waveforms.

12. The article of claim 11, the storage medium storing instructions that when executed by the computer cause the computer to:

project the dispersion curve onto a slowness axis, wherein a slowness projection at a depth is displayed as a log versus the depth.

13. The method of claim 1, wherein the storage medium storing instructions that when executed by the computer cause the computer to:

improve the first and second slowness estimates by iteratively providing the first slowness estimate, providing the second slowness estimate, and comparing the first and second slowness estimates.

14. The method of claim 1, wherein the storage medium storing instructions that when executed by the computer cause the computer to:

output a finalized slowness log based on a selected slowness estimate of the first and second slowness estimates.

15. The method of claim 14, wherein the storage medium storing instructions that when executed by the computer cause the computer to:

provide the user interface for a user to determine the selected slowness estimate of the first and second slowness estimates.

16. The method of claim 1, wherein the storage medium storing instructions that when executed by the computer cause the computer to:

provide a plurality of first slowness estimates using the acoustic measurement tool;

provide a plurality of second slowness estimates based at least in part on the modeled acoustic waveforms;

compare the plurality of first and second slowness estimates; and determine one or more selected slowness estimates from the plurality of first and second slowness estimates.

17. The method of claim 1, wherein the storage medium storing instructions that when executed by the computer cause the computer to:

provide the first slowness estimate via a first integrated slowness determination based at least in part on the data representing acoustic waveforms measured downhole; and provide the second slowness estimate via a second integrated slowness determination based at least in part on the modeled acoustic waveforms, wherein the first and second integrated slowness determinations are performed via at least one integrated slowness determination engine.

18. The method of claim 17, wherein the storage medium storing instructions that when executed by the computer cause the computer to:

provide the user interface for a user to organize an order and/or a timing of acoustic processing elements of the at least one integrated slowness determination engine for receiving and processing acoustic waveforms, including manipulating visual representations on the user interface to show the order and/or the timing.

19. The article of claim 4, the storage medium storing instructions that when executed by the computer cause the computer to:

improve at least one integrated slowness determination engine by iteratively providing the at least one first slowness estimate, providing the at least one second slowness estimate, and comparing the at least one first slowness estimate and the at least one second slowness estimate.

20. The article of claim 4, the storage medium storing instructions that when executed by the computer cause the computer to:

provide the at least one first slowness estimate via a first integrated slowness determination based at least in part on the data representing acoustic waveforms measured downhole;

provide the at least one second slowness estimate via a second integrated slowness determination based at least in part on the modeled acoustic waveforms, wherein the first and second integrated slowness determinations are performed via at least one integrated slowness determination engine; and provide a user interface for a user to organize an order and/or a timing of acoustic processing elements of the at least one integrated slowness determination engine for receiving and processing acoustic waveforms, including manipulating visual representations on the user interface to show the order and/or the timing.

* * * * *